| United States Patent [19] | [11] | 4,314,911 |
|---|---|---|
| Giannini et al. | [45] | * Feb. 9, 1982 |

[54] POLYMERIZATION CATALYST

[75] Inventors: Umberto Giannini; Paolo Longi; Domenico Deluca; Angelo Pricca, all of Milan, Italy

[73] Assignee: Montecatini Edison S.p.A., Milan, Italy

[ * ] Notice: The portion of the term of this patent subsequent to May 5, 1998, has been disclaimed.

[21] Appl. No.: 69,363

[22] Filed: Aug. 23, 1979

Related U.S. Application Data

[63] Continuation of Ser. No. 530,205, Dec. 6, 1974, abandoned, which is a continuation of Ser. No. 167,872, Jul. 30, 1971, abandoned.

[30] Foreign Application Priority Data

Jul. 31, 1970 [IT] Italy .................... 28131 A/70

[51] Int. Cl.³ .................... C08F 4/02; C08F 4/64
[52] U.S. Cl. .................... 252/429 A; 252/429 B; 252/429 C; 526/114; 526/125; 526/122; 526/119
[58] Field of Search ................ 526/97, 122, 119, 125; 252/429 A, 429 B

[56] References Cited

U.S. PATENT DOCUMENTS

| 2,981,725 | 4/1961 | Luft et al. ............... | 526/125 |
| 3,166,542 | 1/1965 | Orzechowski et al. ...... | 526/124 |
| 3,850,842 | 11/1974 | Longi et al. ............ | 526/125 |

FOREIGN PATENT DOCUMENTS

| 601919 | 7/1960 | Canada ..................... | 526/129 |
| 1958488 | 5/1970 | Fed. Rep. of Germany ...... | 526/125 |
| 1958046 | 6/1970 | Fed. Rep. of Germany ...... | 526/125 |
| 2000585 | 7/1970 | Fed. Rep. of Germany ...... | 526/125 |
| 94679 | 8/1969 | France ..................... | 526/121 |
| 2014330 | 4/1970 | France ..................... | 526/124 |
| 981375 | 1/1965 | United Kingdom ............ | 526/158 |

Primary Examiner—Edward J. Smith

[57] ABSTRACT

New, highly active catalysts for the polymerization of ethylene and mixtures of ethylene with higher alpha-olefins and/or diolefins, are disclosed. The catalysts are prepared by mixing (a) hydrides or organometallic compounds of metals belonging to Groups I, II or III of the Mendelyeev Periodic Table with (b) the products obtained by contacting titanium compounds with activated anhydrous halides of magnesium or manganese, diluted with anhydrous compounds of metals belonging to Groups III or IV of said Periodic Table, and which are different from either (a) or the titanium compound of (b).

25 Claims, No Drawings

POLYMERIZATION CATALYST

This is a continuation of application Ser. No. 530,205, filed Dec. 6, 1974, now abandoned, which in turn is a continuation of application Ser. No. 167,872 filed July 30, 1971 and now abandoned.

THE PRIOR ART

The homo- and co-polymerization of ethylene has been carried out heretofore with the aid of catalysts of various types.

Among the best known of such catalysts nowadays are those prepared by mixing transition metal compounds with organometallic compounds of the Groups I to III metals.

In earlier applications originating with our group, it was shown that catalysts of markedly increased activity could be obtained by contacting Ti or V compounds with carriers consisting of activated anhydrous halides of magnesium, zinc or manganese, and then mixing the resulting product with hydrides or organometallic compounds of the Groups I to III metals.

THE PRESENT INVENTION

We have found that, surprisingly, it is possible to obtain equally active catalysts by contacting various titanium compounds with carriers consisting of activated anhydrous halides of magnesium or manganese diluted with anhydrous compounds of metals belonging to Groups III or IV of the Mendelyeev Periodic Table, and then mixing the resulting products with the hydrides or organometallic compounds of the Groups I to III metals.

These new catalysts have all of the advantages of those disclosed earlier by our research group and in which the carrier consists only of the anhydrous Mg or Mn (or Zn) halide in the active form, and some additional advantages, as well.

The compounds of the metals belonging to Groups III or IV which we use as diluents in the carriers are compounds which do not interact to any substantial extent with the active Mg or Mn halide, under the conditions of preparation of the carrier, even when the diluent is used in considerable quantities.

The catalysts of this invention, therefore, are prepared by mixing a hydride or organometallic compound of metals belonging to Groups I, II or III with the product obtained by contacting a Ti compound with a carrier which is a mixture of an anhydrous Mg or Mn halide in active form and one or more compounds of the metals belonging to Groups III or IV, as defined above.

By magnesium or manganese halide in active form, as used herein and in practicing this invention, is meant an Mg or Mn halide in a form characterized in that, in its X-ray spectrum, the diffraction line which is most intense in the spectrum of the normal, non-active Mg or Mn halide shows decreased intensity, and/or in that its surface area is greater than 3 m$^2$/g, preferably greater than 10 m$^2$/g.

The anhydrous Mg or Mn halides can be converted to the active form during the contacting with the titanium compound, or may be activated prior to such contacting.

Various methods can be used for preactivating the Mg or Mn halide.

One of the most suitable methods consists in dissolving the halides in alcohols, ethers or other organic or inorganic solvents, removing most of the solvent by rapid evaporation, and then completing the solvent removal at reduced pressure and at temperatures higher than 100° C., and comprised, more particularly, between 150° C. and 500° C.

The preactivated Mg and Mn halides can be obtained, also, by very fine grinding of the carrier particles, or by any other physical method involving subjecting the carrier particles to the action of friction and/or sliding forces.

Another method for obtaining the Mg halides in the active form comprises starting with RMgX compounds, in which R is a hydrocarbon radical and X is halogen, and converting the same to the active Mg halide either by disproportionment according to known methods, or by treatment of the RMgX compound with halogenated compounds such as, for instance, HCl.

The preactivated anhydrous magnesium or manganese halide can be obtained by thermal decomposition, under reduced pressure, of an addition compound of the halide with a Lewis acid base.

A presently preferred method of preparing the supported catalyst-forming component consists in co-grinding the Ti compound with a mixture of the Mg or Mn halide and an anhydrous compound of the metal belonging to Group III or IV. The co-grinding is preferably carried out in a ball mill, under dry conditions, without use of any liquid diluent or solvent.

The supported catalyst-forming component can also be prepared by simply adding the Ti compound to a previously ground mixture of the Mg or Mn halide and the anhydrous compound of the Group III or IV metal.

The compounds of Group III or IV metals which are substantially inert to the anhydrous Mg or Mn halide under the conditions used to prepare the carrier, include:

Aluminum chloride, lead dichloride, the dichloride, aluminum oxide, silicium oxide, tin oxides, titanium dioxide, zirconium dioxide, aluminum sulphate, titanyl sulphate, aluminum stearate, tin basic sulphate, lead sulphate, aluminum phosphate, and boric anhydride.

The amount of the anhydrous Group III or IV metal compound which can be mixed with the anhydrous Mg or Mn halide without appreciably reducing the activity of the catalyst may vary widely.

Mixtures of the Mg or Mn halide with the Group III or IV metal compounds in which the quantity of the Group III or IV metal compound is from 1% to 80% by weight, preferably from 30% to 80% by weight, yield final catalysts the activity of which is comparable to the activity of the catalysts obtained from carriers consisting only of anhydrous Mg Cl$_2$ or Mn Cl$_2$, in activated form.

The titanium compounds which can be contacted with the mixture of active Mg or Mn halide and Group III or IV metal compounds to obtain the supported catalyst-forming component, include the halides, oxyhalides, halo-alcoholates, alcoholates, halo-titanates or titanates of ammonium and alkylammonium or of alkaline metals; the Ti-amides and Ti-halo-amides; the Ti salts or organic acids, as well as the addition compound of bivalent, trivalent and tetravalent titanium with electron-donor compounds in which the electron-donor atoms are generally atoms of N, P, O and S, such as: ethers, phosphines, amines and thioethers.

Other useful Ti compounds are those obtainable from the aforesaid Ti compounds and from alcoholates and amides of the alkaline metals, such as:

Li(OC$_3$H$_7$)$_2$Cl$_3$ and LiTi(C$_{12}$H$_8$N)$_4$, C$_{12}$H$_8$N being the carbazyl radical.

Typical examples of Ti compounds useful for preparing the catalysts according to the present invention are:

TiCl$_4$, TiCl$_3$, 3TiCl$_3$.AlCl$_3$, TiI$_4$, Ti(OC$_3$H$_7$)Cl$_3$,
Ti(OC$_4$H$_9$)$_2$Cl$_2$,
Ti[OC(CH$_3$)=CH-CO-CH$_3$]$_2$Cl$_2$,
Ti[N(C$_2$H$_5$)$_2$]Cl$_3$, Ti[N(C$_6$H$_5$)$_2$]Cl$_3$,
Ti[N(C$_6$H$_5$)$_2$]$_4$, TiCl$_3$(OSO$_2$-C$_6$H$_5$),
Ti(C$_6$H$_5$COO)Cl$_3$, [N(C$_4$H$_9$)$_4$]$_2$TiCl$_6$,
[N(CH$_3$)$_4$]Ti$_2$Cl$_9$, TiBr$_4$.O(C$_2$H$_5$)$_2$, 2TiCl$_3$,
C$_5$H$_5$N, LiTi(OC$_3$H$_7$)$_2$Cl$_3$, LiTi(C$_{12}$H$_8$N)$_4$
(lithium-titanium tetracarbazyl).

The amount of Ti compound used in preparing the carried catalyst-forming component can vary within a wide range. For instance, the Ti compound can be used in a minimum amount of 0.01% by weight, or even less, with respect to the carrier, up to a maximum amount of 30% or higher, by weight.

Particularly good results, so far as concerns the polymer yield obtained with the catalysts of this invention, and referred to both the Ti compound and the carrier, are obtained when the amount of Ti compound on the carrier is from 1% to 10% by weight.

Hydrides and organometallic compounds which can be used as the other catalyst-forming component include:

Al(C$_2$H$_5$)$_3$, Al(C$_2$H$_5$)H, Al(iC$_4$H$_9$)$_3$, Al(iC$_4$H$_9$)$_2$Cl,
Al$_2$(C$_2$H$_5$)$_3$Cl$_3$, Al(C$_2$H$_5$)$_2$Cl, Al(iC$_4$H$_9$)$_2$H,
Al(C$_2$H$_5$)$_2$Br, LiAl(iC$_4$H$_9$)$_4$, LiC$_4$H$_9$;

which are particularly fit for the catalyst preparation.

The molar ratio of organometallic compound to Ti compound is not critical.

When the catalysts are to be used for polymerizing ethylene, said molar ratio is preferably comprised between 50 and 1000.

The polymerization and copolymerization of olefins in contact with the present catalysts are carried out by the conventional methods, namely in the liquid phase, either in the presence or absence of an inert solvent, or in the gas phase.

The polymerization or copolymerization temperature may range from −80° C. to 200° C., preferably from 50° C. to 100° C., provided the operation is conducted at atmospheric or at increased pressure.

It is a particularly important advantage of the catalysts of this invention that the activity of the catalysts is not appreciably reduced when they are used in the presence of the conventional regulators of the molecular weight of the olefin polymers or copolymers, such as alkyl halides, organometallic compounds of zinc or cadmium, or hydrogen.

This is in contrast to known catalysts such as the so-called, now conventional, "Ziegler catalysts" prepared from transition metal compounds of the type of TiCl$_4$, and organometallic compounds of the Groups I, II or III metals. As is well known, the activity of such known catalysts is considerably reduced by the presence, in the polymerization system, of hydrogen or the other known chain transfer agents commonly used to regulate the molecular weight of the polymer produced.

With the present catalysts, conversely, it has been found possible to regulate the molecular weight of the polymer produced to low, and even very low values, without any noticeable decrease in the activity of these catalysts.

For instance, when ethylene is polymerized in contact with the catalysts of this invention, it is possible to adjust the molecular weight of the polyethylene produced to values in a practically desirable range corresponding to an inherent viscosity of about 1 to 3 dl/g, determined in tetralin at 135° C. And this can be accomplished without causing any decrease in the polyethylene yield, based on the amount of these particularly active catalysts used, to a value such that, at the end of the polymerization, it is necessary to subject the polymer to special purification treatments for the removal of catalytic residues from it.

The fact that the polymer can be used directly as obtained, without resort to the special purification treatment, is another marked advantage of the catalysts of this invention.

The polyethylene obtained with the aid of the present catalysts is a substantially linear and highly crystalline polymer having a density of 0.96 g/cc or higher. Its workability or processability characteristics are generally better than those of the polyethylene obtained with the aid of the standard "Ziegler catalysts".

Generally, the Ti content of the unpurified polymer obtained using the present catalysts is lower than 10 ppm.

The present catalysts in which the carrier is diluted with the Group III or IV metal compound, also have some advantages over the catalysts disclosed previously by our group and in which the carrier consists only of the activated anhydrous halides of magnesium or manganese.

The main such advantage is that any catalytic residues remaining in the polyethylene obtained with the aid of the present catalysts comprise even smaller amounts of magnesium halide and, in consequence, afford even less possibility of corrosion when the polyethylene is molded or otherwise shaped by the usual molding and shaping procedures.

The following examples are given to illustrate the invention and are not intended to be limiting. Unless otherwise specified, percentages given in the examples are by weight. The inherent viscosity of the polymer was determined in tetralin at 135° C.

EXAMPLES 1 to 6

TiCl$_4$, anhydrous MgCl$_2$ (dried for 48 hours in HCl flow at 350° C.) or mixtures of same with some anhydrous compounds of metals belonging to the III and IV Groups of the Mendelyeev Periodic system, in the quantities specified in Table I, are introduced into a glass mill (length: 100 mm, diameter: 50 mm) containing 550 g of steel balls having a 9.5 mm diameter, in nitrogen atmosphere.

The mixture thus obtained is then ground for 16 hours at a temperature of 20° C.

A given quantity of the mixture thus prepared is introduced, together with 1500 cc of n-heptane and 2 cc of Al(i-C$_4$H$_9$)$_3$, into a stainless steel autoclave of 3000 cc capacity, provided with an anchor stirrer and adjusted at a temperature of 85° C.

The whole is charged with 7 atm. of hydrogen and 6 atm. of ethylene, and the pressure is kept constant by continuously feeding in ethylene.

The polymerization is interrupted after 4 hours; a filtration is carried out, and the polymer obtained is then dried.

The results, concerning the quantity and inherent viscosity of the polymer obtained, as well as the polymer yield with respect to the employed titanium-carried component, and MgCl$_2$, are reported in Table I.

EXAMPLES 7 to 12

3 TiCl$_3$.AlCl$_3$ (obtained by reduction of TiCl$_4$ with aluminum and activated by grinding), anhydrous MgCl$_2$ or mixtures of same with some anhydrous compounds of metals belonging to the Groups III and IV, in the quantities specified in Table II, are ground for 16 hours at 20° C. in the mill described in Example 1, in nitrogen atmosphere.

By using a given quantity of the mixture thus obtained and by operating under the polymerization conditions described in Example 1, the results indicated in Table II were obtained.

EXAMPLES 13 to 15

3 TiCl$_3$.AlCl$_3$ (obtained by reduction of TiCl$_4$ with aluminum and activated by grinding) and anhydrous MnCl$_2$ (obtained by dissolution of MnCl$_2$ in anhydrous ethanol, evaporation and successive grinding at 300° C. under an 0.5 mm Hg vacuum), or mixtures of same with some anhydrous compounds of the Group IV metals, in the quantities specified in Table III, are ground for 24 hours in the mill described in Example 1, in nitrogen atmosphere, at 20° C.

By using a given quantity of the mixtures thus obtained, ethylene polymerization tests have been carried out under the experimental conditions indicated in Table III; the same table reports also the relevant results.

EXAMPLES 16 and 17

Cl$_3$TiN(C$_2$H$_5$)$_2$ and anhydrous MgCl$_2$ or a mixture of same with silica, according to the quantities specified in Table IV, are ground for 64 hours in the mill described in Example 1, in nitrogen atmosphere, at 20° C.

By using a given quantity of the mixtures thus obtained and by operating under the polymerization conditions according to Example 1, the results specified in Table IV are attained.

EXAMPLES 18 and 19

Cl$_3$Ti(n-OC$_3$H$_7$) and anhydrous MgCl$_2$ or a mixture of same with silica, in the quantities specified in Table V, are ground for 16 hours in the mill described in Example 1, in nitrogen atmosphere, at 20° C.

By using a given quantity of the mixtures thus prepared, some ethylene polymerization tests have been carried out under the experimental conditions indicated in Table V; the same table reports also the results attained.

EXAMPLES 20 to 22

TiCl$_4$ and anhydrous MgCl$_2$ or mixtures of same with anhydrous PbCl$_2$ or SnCl$_2$, in the quantities reported in Table VI, are ground for 16 hours in the mill described in Example 1, in nitrogen atmosphere, at 20° C.

By employing a given quantity of the mixtures thus prepared, some ethylene polymerization tests have been carried out under the experimental conditions indicated in Table VI, in which also the attained results are shown.

TABLE I

| Example No. | Grinding of the Carried Component | | | | Carried component employed mg | Polyethylene obtained g | g Polymer g Ti | g Polymer g total carried component | g Polymer g MgCl$_2$ | $\eta$ in dl.g$^{-1}$ |
| --- | --- | --- | --- | --- | --- | --- | --- | --- | --- | --- |
| | MgCl$_2$ g | Diluent Type | g | TiCl$_4$ g | Ti % by weight | | | | | |
| 1 | 1.7010 | Silica* | 1.6240 | 0.140 | 1.02 | 19.0 | 203 | 1,045,000 | 10,680 | 21,780 | 1.16 |
| 2 | 4.3082 | TiOSO$_4$ | 4.3500 | 0.3580 | 1.005 | 14.2 | 146 | 1,020,000 | 10,270 | 21,500 | 1.46 |
| 3 | 4.3652 | B$_2$O$_3$ | 4.3256 | 0.278 | 0.782 | 23.7 | 142 | 766,000 | 6,000 | 12,320 | 1.30 |
| 4 | 4.2726 | Al$_2$(SO$_4$)$_3$ | 4.2350 | 0.352 | 1.005 | 32.2 | 235 | 728,000 | 7,300 | 15,120 | 1.26 |
| 5 | 4.2882 | AlPO$_4$ | 4.3172 | 0.4110 | 1.147 | 31.7 | 351 | 991,000 | 11,350 | 23,250 | 1.26 |
| 6 | 10.0105 | — | — | 0.4000 | 0.97 | 11.0 | 90 | 864,000 | 8,180 | 8,510 | 1.33 |

*Syloid Al-1 silica, Grace-Davison, calcined at 900° C. for 6 hours in nitrogen flow sults.

TABLE II

| Example No. | Grinding of the Carried Component | | | | Carried Component employed mg | Poly-ethylene obtained g | g Polymer g Ti | g Polymer g total carried component | g Polymer g MgCl$_2$ | $\eta$ in dl.g$^{-1}$ |
| --- | --- | --- | --- | --- | --- | --- | --- | --- | --- | --- |
| | MgCl$_2$ g | Diluent type | g | 3TiCl$_3$. AlCl$_3$ g | Ti % by weight | | | | | |
| 7 | 2.6185 | Silica* | 4.9592 | 1.6379 | 4.28 | 20.2 | 355 | 410,000 | 17,550 | 62,000 | 1.49 |
| 8 | 1.4326 | " | 5.9293 | 1.5188 | 4.12 | 21.2 | 279 | 320,000 | 13,150 | 80,160 | 1.61 |
| 9 | 2.6437 | Silica*** | 4.9840 | 1.6632 | 4.32 | 18.8 | 236 | 291,000 | 12,550 | 44,100 | 1.55 |
| 10 | 7.1536 | Alumina** | 4.3099 | 2.5208 | 4.34 | 21.3 | 178 | 192,000 | 8,360 | 16,320 | 1.40 |
| 11 | 2.6274 | Kieselgur | 5.0275 | 1.6607 | 4.29 | 26.0 | 199 | 178,000 | 7,650 | 27,150 | 1.70 |
| 12 | 7.4272 | — | — | 1.6088 | 4.28 | 15.6 | 166 | 249,000 | 10,650 | 12,930 | 1.33 |

*Syloid Al-1 silica, Grace-Davison, calcined at 900° C. for 6 hours in nitrogen flow
**Merck alumina, calcined at 500° C. in nitrogen flow
***Syloid Al-1 silica, Grace-Davison, calcined at 300° C. for 8 hours in nitrogen flow

TABLE III

| Example No. | Grinding of the Carried Component | | | 3TiCl₃·AlCl₂ g | Ti % by weight | Polymerization | | | | | |
|---|---|---|---|---|---|---|---|---|---|---|---|
| | MnCl₂ g | Diluent Type | g | | | Carried Component employed mg | Polyethylene obtained g | g Polymer g Ti | g Polymer g total carried component | g Polymer g MnCl | η in dl.g⁻¹ |
| 13 | 2.7658 | Silica* | 5.0120 | 0.3543 | 1.05 | 53.5 | 370 | 658,000 | 6,920 | 20,350 | 2.09 |
| 14 | 4.3091 | TiO₂ | 4.3311 | 0.3807 | 1.018 | 43.0 | 301 | 688,000 | 7,000 | 14,650 | 2.09 |
| 15 | 8.6208 | — | — | 0.3834 | 1.025 | 34.6 | 185 | 522,000 | 5,350 | 5,580 | 2.44 |

*Syloid Al-1 silica, Grace-Davison, calcined at 900° C. for 6 hours in nitrogen flow
Polymerization conditions
Autoclave : 3,000 cc
Temperature : 85° C.
n-heptane : 1,500 cc
Al(i-C₄H₉)₃ : 2 cc
H₂ : 5 atm.
Ethylene : 10 atm. const.
Time : 8 hours

TABLE IV

| Ex. No. | Grinding of the Carried Component | | | | | Ti % by weight | Polymerization | | | | | |
|---|---|---|---|---|---|---|---|---|---|---|---|---|
| | MgCl₂ g | Diluents Type | g | Titanium Compound Type | g | | Carried Component employed mg | Polyethylene obtained g | g Polymer g Ti | g Polymer g total carried component | g Polymer g MgCl₂ | η in dl.g |
| 16 | 4.3859 | Silica* | 4.3975 | Cl₃TiN(C₂H₅)₂ | 0.3880 | 0.896 | 14.2 | 107 | 842,000 | 7,540 | 15,770 | 1.23 |
| 17 | 9.52 | — | — | Cl₃TiN(C₂H₅)₂ | 0.420 | 0.895 | 14.3 | 105 | 820,000 | 7,340 | 7,660 | 1.23 |

*Syloid Silica, Grace-Davison, calcined at 900° C. for 6 hours in nitrogen flow

TABLE V

| Ex. No. | Grinding of the Carried Component | | | | | Ti % by weight | Polymerization | | | | | |
|---|---|---|---|---|---|---|---|---|---|---|---|---|
| | MgCl₂ g | Diluents Type | g | Titanium Compound Type | g | | Carried Component employed mg | Polyethylene obtained g | g Polymer g Ti | g Polymer g total carried component | g Polymer g MgCl₂ | η in dl.g⁻¹ |
| 18 | 4.3121 | Silica* | 4.3401 | Cl₃Ti(n-OC₃H₇) | 0.3596 | 0.897 | 16.0 | 283 | 1,975,000 | 17,680 | 36,950 | 2.0 |
| 19 | 10.810 | — | — | Cl₃Ti(n-OC₃H₇) | 0.450 | 0.900 | 12.4 | 241 | 2,160,000 | 19,400 | 20,250 | 1.97 |

*Grace-Davison Syloid silica, calcined at 900° C. for 6 hours in nitrogen flow
Polymerization conditions
Autoclave : 2,000 cc
Temperature : 85° C.
n-heptane : 1,000 cc
Al(iC₄H₉)₃ : 2 cc
H₂ = 5 atm.
Ethylene = 10 atm. const.
Time = 8 hours

TABLE VI

| Example No. | Grinding of the Carried Component | | | TiCl₄ g | Ti % by weight | Polymerization | | | | | |
|---|---|---|---|---|---|---|---|---|---|---|---|
| | MgCl₂ g | Diluent Type | g | | | Carried Component employed mg | Polyethylene obtained g | g Polymer g Ti | g Polymer g total carried component | g Polymer g MgCl₂ | η in dl.g⁻¹ |
| 20 | 4.750 | PbCl₂ | 0.05 | 0.410 | 0.784 | 23.8 | 355 | 1,900,000 | 14,900 | 40,150 | 1.88 |
| 21 | 3.470 | SnCl₂ | 6.90 | 0.410 | 0.96 | 15.8 | 280 | 1,845,000 | 17,720 | 55,000 | 2.00 |
| 22 | 12.710 | — | — | 0.410 | 0.790 | 17.4 | 238 | 1,735,000 | 13,680 | 14,100 | 1.82 |

Polymerization conditions
Autoclave : 2000 cc
Temperature : 85° C.
n-heptane : 1000 cc
Al(i-C₄H₉)₃ : 2 cc
H₂ : 5 atm.
Ethylene : 10 atm. const.
Time : 8 hours While the examples show the use of triisobutyl aluminum as one catalyst-forming component, similar results are obtainable using other organometallic compounds, and hydrides, of the Groups I to III metals, as disclosed herein.

It will be apparent that various changes in details can be made in practicing the invention, including selection of the organometallic compound or hydride of the Group I, II or III metal; selection of the specific Ti compound; and selection of the Group III or IV compound used as diluent in the carrier, without departing from the spirit of the invention. Therefore, we intend to include, in the scope of the appended claims, all those changes and modifications which will be obvious to those skilled in the art from the description and illustrative working examples given herein.

What we claim is:

1. Catalysts for polymerizing olefins and obtained by mixing:
   (a) a catalyst-forming component which is a hydride or organometallic compound of a metal belonging to Groups I to III of the Mendelyeev Periodic Table, and
   (b) a catalyst-forming component prepared by co-grinding (1) a titanium compound selected from the group consisting of titanium halides, oxyhalides, halo-alcoholates and alcoholates, ammonium halotitanates, alkyl-ammonium halo-titanates, halotitanates of alkaline metals, ammonium titanates, alkyl-ammonium titanates, alkaline metal titanates, titanium amides, titanium haloamides, titanium salts of organic acids, and addition compounds of titanium with electron-donors, with a carrier consisting of (2) an anhydrous compound of a metal belonging to Groups III to IV of the Mendelyeev Periodic Table selected from the group consisting of aluminum oxide, lead dichloride, silicon oxide, titanium dioxide, aluminum sulphate, titanyl sulphate, aluminum phosphate and boric anhydride, and (3) an anhydrous normal magnesium or manganese dihalide, until the magnesium or manganese dihalide is activated by the cogrinding to a condition such that the surface area thereof is greater than 3 $m^2/g$, the amount of the metal compound (2) being from 30% to 80% by weight of (2) and (3).

2. A catalyst according to claim 1, characterized in that the amount of titanium compound (1) on the carrier is from about 0.01% by weight to about 30% by weight.

3. A catalyst according to claim 1, characterized in that the amount of titanium compound (1) on the carrier is from 1% to 10% by weight.

4. Catalysts according to claim 1, in which the titanium compound is $TiCl_4$.

5. Catalysts according to claim 1, in which the anhydrous compound (2) is aluminum oxide.

6. Catalysts according to claim 1, in which the anhydrous compound (2) is silicon oxide.

7. Catalysts according to claim 1, in which the titanium compound is $TiCl_4$ and the anhydrous compound (2) is aluminum oxide.

8. Catalysts according to claim 1 in which the titanium compound is $TiCl_4$ and the anhydrous compound (2) is silicon oxide.

9. Catalysts for polymerizing olefins and obtained by mixing:
   (a) a catalyst-forming component which is a hydride or organometallic compound of a metal belonging to Groups I to III of the Mendelyeev Periodic Table and
   (b) a catalyst-forming component prepared by contacting (1) a titanium compound selected from the group consisting of titanium halides, oxyhalides, halo-alcoholates and alcoholates, ammonium halotitanates, alkyl-ammonium halo-titanates, halotitanates of alkaline metals, ammonium titanates alkyl-ammonium titanates, alkaline metal titanates, titanium amides, titanium haloamides, titanium salts of organic acids, and addition compounds of titanium with electron-donors, with a carrier consisting of (2) an anhydrous compound of a metal belonging to Groups III to IV of the Mendelyeev Periodic Table selected from the group consisting of aluminum oxide, lead dichloride, silicon oxide, titanium dioxide, aluminum sulphate, titanyl sulphate, aluminum phosphate and boric anhydride, and (3) an anhydrous magnesium dichloride in an active state such that the surface area thereof is greater than 3 $m^2/g$, the amount of the metal compound (2) being from 30% to 80% by weight of (2) and (3).

10. Catalysts according to claim 9, in which the titanium compound is $TiCl_4$.

11. Catalysts according to claim 9, in which the anhydrous compound (2) is aluminum oxide.

12. Catalysts according to claim 9, in which the anhydrous compound (2) is silicon oxide.

13. Catalysts according to claim 9, in which the titanium compound is $TiCl_4$ and the anhydrous compound (2) is aluminum oxide.

14. Catalysts according to claim 9, in which the titanium compound is $TiCl_4$ and the anhydrous compound (2) is silicon oxide.

15. Catalysts according to claim 1 or 9, in which component (a) is an Al trialkyl or dialkyl Al halide in which the alkyl radical contains from 2 to 4 carbon atoms.

16. Catalysts according to claim 1 or 9, in which component (a) is an Al trialkyl or dialkyl Al halide in which the alkyl radical contains from 2 to 4 carbon atoms, the titanium compound is $TiCl_4$ and the anhydrous compound (2) is aluminum oxide.

17. Catalysts according to claim 1 or 9, in which component (a) is an Al trialkyl or dialkyl Al halide, the alkyl groups of which contain from 2 to 4 carbon atoms, the titanium compound is $TiCl_4$, and the anhydrous compound (2) is silicon oxide.

18. A catalyst-forming component for use in preparing polymerization catalysts and consisting essentially of the product obtained by cogrinding (1) a titanium compound selected from the group consisting of titanium halides, oxyhalides, halo-alcoholates and alcoholates, ammonium halo-titanates, alkyl-ammonium halo-titanates, halo-titanates of alkaline metals, ammonium titanates, alkyl-ammonium titanates, alkaline metal titanates, titanium amides, titanium haloamides, titanium salts of organic acids, and addition compounds of titanium with electron-donors, with a carrier consisting of (2) an anhydrous compound of a metal belonging to Groups III to IV of the Mendelyeev Periodic Table selected from the group consisting of aluminum oxide, lead dichloride, silicon oxide, titanium dioxide, aluminum sulphate, titanyl sulphate, aluminum phosphate and boric anhydride, and (3) an anhydrous normal magnesium or manganese dihalide, until the magnesium or manganese dihalide is converted to an active state such that the surface area thereof is greater than 3 $m^2/g$, the amount of the metal compound (2) being from 30% to 80% by weight of the mixture of (2) and (3).

19. A catalyst-forming component according to claim 18, in which the titanium compound is $TiCl_4$.

20. A catalyst-forming component according to claim 18, in which the anhydrous compound (2) is aluminum oxide.

21. A catalyst-forming component according to claim 18, in which the anhydrous compound (2) is silicon oxide.

22. A catalyst-forming component according to claim 18, in which the titanium compound is $TiCl_4$, and the anhydrous compound (2) is aluminum oxide.

23. A catalyst-forming component according to claim 18, in which the titanium compound is TiCl$_4$ and the anhydrous compound (2) is silicon oxide.

24. The process for preparing polymerization catalysts which comprises mixing
(a) a catalyst-forming component which is a hydride or organometallic compound of a metal belonging to Groups I to III of the Mendelyeev Periodic Table and
(b) a catalyst-forming component obtained by cogrinding (1) a titanium compound selected from the group consisting of titanium halides, oxyhalides, halo-alcoholates and alcoholates, ammonium halo-titanates, alkyl-ammonium halo-titanates, halo-titanates of alkaline metals, ammonium titanates, alkyl-ammonium titanates, alkaline metal titanates, titanium amides, titanium haloamides, titanium salts of organic acids, and addition compounds of titanium with electron-donors, with a carrier consisting of (2) an anhydrous compound of a metal belonging to Groups III to IV of the Mendelyeev Periodic Table selected from the group consisting of aluminum oxide, lead dichloride, silicon oxide, titanium dioxide, aluminum sulphate, titanyl sulphate, aluminum phosphate and boric anhydride, and (3) an anhydrous normal magnesium or manganese dihalide, until the magnesium or manganese dihalide is activated by the cogrinding to a condition such that the surface area thereof is greater than 3 m$^2$/g, the amount of the metal compound (3) being from 30% to 80% by weight of the mixture of (2) and (3).

25. The process for preparing polymerization catalysts which comprises mixing
(a) a catalyst-forming component which is a hydride or organometallic compound of a metal belonging to Groups I to III of the Mendelyeev Periodic Table and
(b) a catalyst-forming component obtained by contacting a Ti compound selected from the group consisting of titanium halides, oxyhalides, halo-alcoholates and alcoholates, ammonium halo-titanates, alkyl-ammonium halo-titanates, halo-titanates of alkaline metals, ammonium titanates, alkyl-ammonium titanates, alkaline metal titanates, titanium amides, titanium haloamides, titanium salts of organic acids, and addition compounds of titanium with electron-donors, with a carrier consisting of (2) an anhydrous compound of a metal belonging to Groups III to IV of the Mendelyeev Periodic Table selected from the group consisting of aluminum oxide, lead dichloride, silicon oxide, titanium dioxide, aluminum sulphate, titanyl sulphate, aluminum phosphate and boric anhydride, and (3) an anhydrous magnesium dichloride in an active state such that the surface area thereof is greater than 3 m$^2$/g, the amount of the metal compound (2) being from 30% to 80% by weight of the mixture of (2) and (3).

* * * * *

UNITED STATES PATENT AND TRADEMARK OFFICE
CERTIFICATE OF CORRECTION

PATENT NO. : 4,314,911    Page 1 of 8
DATED : February 9, 1982
INVENTOR(S) : Umberto GIANNINI et al It is certified that error appears in the above—identified patent and that said Letters Patent is hereby corrected as shown below:

Col. 2 - line 21   "Lewis acid base" should be
- - - Lewis base - - -;

Col. 2 - line 38   "silicium oxide" should be
- - - silicon oxide - - -;

Col. 2 - line 60   "alkaline metals" should be
- - - alkali metals - - -;

Col. 2 - line 61   "compound" should be - - - compounds - - -;

Col. 2 - line 69   "alkaline metals" should be
- - - alkali metals - - -;

Col. 3 - line 1   "Li(OC$_3$H$_7$)$_2$Cl$_3$" should be
- - - LiTi(OC$_3$H$_7$)$_2$Cl$_3$ - - -

Col. 3 - line 31   "Al(C$_2$H$_5$)H" should be - - - Al(C$_2$H$_5$)$_2$H - - -;

Cols. 5 - 6
Table 1
Example 5   Under "Type" - "AlPo$_4$" should be - - - AlPO$_4$ - - -

UNITED STATES PATENT AND TRADEMARK OFFICE
CERTIFICATE OF CORRECTION

PATENT NO. : 4,314,911

DATED : February 9, 1982

INVENTOR(S) : Umberto GIANNINI et al

It is certified that error appears in the above—identified patent and that said Letters Patent is hereby corrected as shown below:

Col. 2 - line 37   "the dichloride" should be

- - - tin dichloride - - -;

Col. 2 - line 61   "salts or" should be - - - salts of - - -;

Col. 3 - line 11   "$2TiCl_3$" should be

- - - $2TiCl_3 \cdot C_5H_5N$ - - -;

Col. 3 - line 12   Cancel "$C_5H_5N$"

Cols. 5 - 6
Table 1
9th, 10th and 11th headings

"$\dfrac{g\ Polymer}{g\ Ti}$"   "$\dfrac{g\ Polymer}{g\ total\ carried\ component}$"   "$\dfrac{g\ Polymer}{g\ MgCl_2}$"

should be

- - - $\dfrac{g\ Polymer}{g\ ti}$   $\dfrac{g\ Polymer}{g\ total\ carried\ component}$   $\dfrac{g\ Polymer}{g\ MgCl_2}$ - - -;

UNITED STATES PATENT AND TRADEMARK OFFICE
CERTIFICATE OF CORRECTION

PATENT NO. : 4,314,911

DATED : February 9, 1982

INVENTOR(S) : Umberto GIANNINI et al

It is certified that error appears in the above—identified patent and that said Letters Patent is hereby corrected as shown below:

Cols. 5 - 6
Table II
9th, 10th, 11th headings

"$\frac{g \text{ Polymer}}{g \text{ Ti}}$"  "$\frac{g \text{ Polymer}}{g \text{ total carried component}}$"  "$\frac{g \text{ Polymer}}{g \text{ MgCl}_2}$"

should be - - -

$\frac{g \text{ Polymer}}{g \text{ Ti}}$    $\frac{g \text{ Polymer}}{g \text{ total carried component}}$    $\frac{g \text{ Polymer}}{g \text{ MgCl}_2}$ - - -;

Cols. 7 - 8
Table III
5th heading

"$AlCl_2$" should be - - - $AlCl_3$ - - -;

Cols. 7 - 8
Table III
11th heading

"MnCl" - - - should be "$MnCl_2$-- -;

UNITED STATES PATENT AND TRADEMARK OFFICE
CERTIFICATE OF CORRECTION

PATENT NO. : 4,314,911           Page 4 of 8
DATED : February 9, 1982
INVENTOR(S) : Umberto GIANNINI et al It is certified that error appears in the above-identified patent and that said Letters Patent is hereby corrected as shown below:

Cols 7 - 8
Table III
9th, 10th, 11th headings

"g Polymer / g Ti"    "g Polymer / g total carried component"    "g Polymer / g MnCl"

should be - - - g Polymer / g Ti    g Polymer / g total carried component    g Polymer / g $MnCl_2$

- - -;

Cols. 7 - 8
Table IV
10th, 11th, 12th headings

"g Polymer / g Ti"    "g Polymer / g total carried component"    "g Polymer / g $MgCl_2$"

should be - - - g Polymer / g Ti    g Polymer / g total carried component    g Polymer / g $MgCl_2$

- - -;

UNITED STATES PATENT AND TRADEMARK OFFICE
CERTIFICATE OF CORRECTION

PATENT NO. : 4,314,911  Page 5 of 8
DATED : February 9, 1982
INVENTOR(S) : Umberto GIANNINI et al It is certified that error appears in the above—identified patent and that said Letters Patent is hereby corrected as shown below:

Cols. 7 - 8
Table V
9th, 10th 11th headings

" $\frac{g \text{ Polymer}}{g \text{ Ti}}$ "  " $\frac{g \text{ Polymer}}{g \text{ total carried component}}$ "  " $\frac{g \text{ Polymer}}{g \text{ MgCl}_2}$ "

should be - - -

$\frac{g \text{ Polymer}}{g \text{ Ti}}$  $\frac{g \text{ Polymer}}{g \text{ total carried component}}$  $\frac{g \text{ Polymer}}{g \text{ MgCl}_2}$

- - -;

UNITED STATES PATENT AND TRADEMARK OFFICE
CERTIFICATE OF CORRECTION

PATENT NO. : 4,314,911

DATED : February 9, 1981

INVENTOR(S) : Umberto GIANNINI et al

It is certified that error appears in the above—identified patent and that said Letters Patent is hereby corrected as shown below:

Cols. 7 - 8
Table VI
9th, 10th, 11th headings

"g Polymer"  
g Ti

" g Polymer "  
g total carried component

"g Polymer"  
g $MgCl_2$ should be - - -

$\dfrac{\text{g Polymer}}{\text{g Ti}}$   $\dfrac{\text{g Polymer}}{\text{g total carried component}}$   $\dfrac{\text{g Polymer}}{\text{g MgCl}_2}$

- - -.

UNITED STATES PATENT AND TRADEMARK OFFICE
CERTIFICATE OF CORRECTION

PATENT NO. : 4,314,911
DATED : February 9, 1982
INVENTOR(S) : Umberto GIANNINI et al It is certified that error appears in the above—identified patent and that said Letters Patent is hereby corrected as shown below:

Cols. 7 - 8 - Table 3 - 11th heading

"g MnCl" should be - - - $MnCl_2$ - - -;

Col. 9 - line 15    "alkaline metals" should be - - - alkali metals - - -;

Col. 9 - lines 16-17    "alkaline metal" should be - - - alkali metal - - -

Col. 9 - line 62    "alkaline metals" should be - - - alkali metals- - -

Col. 9 - line 63    "alkaline metal" should be - - - alkali metal - - -;

Col. 10 - line 42    "alkaline metals" should be - - - alkali metals- - -;

Col. 10 - line 43    "alkaline metal" should be - - - alkali metal - - -;

UNITED STATES PATENT AND TRADEMARK OFFICE
CERTIFICATE OF CORRECTION

PATENT NO. : 4,314,911
DATED : February 9, 1982
INVENTOR(S) : Umberto GIANNINI et al It is certified that error appears in the above—identified patent and that said Letters Patent is hereby corrected as shown below:

Col. 11 - line 15   "alkaline metals" should be - - - alkali metals - - -;

Col. 11 - line 16   "alkaline metal" should be - - - alkali metal - - -;

Col. 12 - line 14   "alkaline metals" should be - - - alkali metals - - -;

Col. 12 - line 15   "alkaline metal" should be - - - alkali metal - - -.

Signed and Sealed this

Tenth Day of August 1982

[SEAL]

Attest:

GERALD J. MOSSINGHOFF

*Attesting Officer*     *Commissioner of Patents and Trademarks*